US011579605B2

(12) United States Patent
Kuehner

(10) Patent No.: US 11,579,605 B2
(45) Date of Patent: Feb. 14, 2023

(54) GRIP STRENGTH SMART GLOVES

(71) Applicant: TOYOTA RESEARCH INSTITUTE, INC., Los Altos, CA (US)

(72) Inventor: Manuel Ludwig Kuehner, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 98 days.

(21) Appl. No.: 17/148,932

(22) Filed: Jan. 14, 2021

(65) Prior Publication Data

US 2022/0221854 A1 Jul. 14, 2022

(51) Int. Cl.
  *G05D 1/00* (2006.01)
  *A41D 19/00* (2006.01)
  *B60W 60/00* (2020.01)

(52) U.S. Cl.
  CPC ....... *G05D 1/0016* (2013.01); *A41D 19/0024* (2013.01); *B60W 60/0015* (2020.02); *G05D 1/0061* (2013.01); *B60W 2540/00* (2013.01)

(58) Field of Classification Search
  CPC .............. G05D 1/0016; G05D 1/0061; A41D 19/0024; B60W 60/0015; B60W 2540/00
  USPC .......................................................... 701/23
  See application file for complete search history.

(56) References Cited

U.S. PATENT DOCUMENTS

| | | | | |
|---|---|---|---|---|
| 6,016,103 | A | * | 1/2000 | Leavitt .................. G08B 21/06 473/202 |
| 7,688,213 | B2 | * | 3/2010 | Power .................... G08B 21/06 340/575 |
| 9,180,812 | B2 | | 11/2015 | Colvin, Sr. |
| 10,093,231 | B1 | | 10/2018 | Harrington |
| 2011/0090487 | A1 | | 4/2011 | Schmidt |
| 2012/0203156 | A1 | | 8/2012 | Dar |
| 2019/0064805 | A1 | * | 2/2019 | Frazzoli .............. G05D 1/0246 |
| 2019/0094088 | A1 | | 3/2019 | Reif |
| 2021/0122415 | A1 | * | 4/2021 | Critchley ............ B62D 15/025 |

OTHER PUBLICATIONS

Wang, Z. et al., "Adaptive Drive-Automation Shared Steering Control via Forearm Surface Electromyography Measurement," arXiv:2009.04100, Sep. 9, 2020.
Newing, Julie "Health: Doctor, Let Me Shake Your Hand: A Stroke Patent Can Once Again Stir Coffee and Drive a Car," The Independent, Aug. 25, 1992.

(Continued)

*Primary Examiner* — Muhammad Shafi
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for influential control over a driver's hand(s) that grip a vehicle's steering wheel. Upon issuing an autonomous control signal to control motive operation of the vehicle, an autonomous control system of the vehicle may further reinforce the application of the autonomous control signal by inducing the driver's hand(s) to grip/increase grip strength on the vehicle's steering wheel or by releasing the grip/decreasing grip strength on the vehicle's steering wheel. Moreover, the increasing/decreasing of the driver's grip may alternatively, or in addition to the reinforcement aspect, induce augmentative or intervening action(s)/behavior(s) by the driver.

18 Claims, 8 Drawing Sheets

(56) References Cited

OTHER PUBLICATIONS

Loureiro, R. C. V. "Advances in Upper Limb Stroke Rehabilitation: A Technology Push," Med Biol Eng Comput (2011) 49:1103-1118.
Diftler, M. et al., "RoboGlove—A Grasp Assist Device for Earth and Space," 45th International Conference on Environmental Systems, Jul. 12-16, 2015, Bellevue, Washington.

* cited by examiner

GRIP STRENGTH SMART GLOVES

TECHNICAL FIELD

The present disclosure relates generally to autonomous driving/assisted driving, and in particular, some implementations may relate to mechanisms influencing driver interaction with a vehicle steering wheel in response to certain autonomous driving/assisted driving operations or actions.

DESCRIPTION OF RELATED ART

Advanced driver-assistance systems (ADAS) can refer to electronic systems that assist a vehicle operator while driving, parking, or otherwise maneuvering a vehicle. ADAS can increase vehicle and road safety by minimizing human error, and introducing some level of automated vehicle/vehicle feature control. Autonomous driving systems may go further than ADAS by leaving responsibility of maneuvering and controlling a vehicle to the autonomous driving systems. For example, an autonomous driving system may comprise some package or combination of sensors to perceive a vehicle's surroundings, and advanced control systems that interpret the sensory information to identify appropriate navigation paths, obstacles, road signage, etc.

BRIEF SUMMARY OF THE DISCLOSURE

In accordance with one embodiment, a vehicle may comprise an autonomous control system adapted to provide one or more commands to autonomously control one or more systems of the vehicle. The vehicle may further comprise an influential control component adapted to impart influential control over a driver's grip on a steering wheel of the vehicle, the imparted influential control effectuating reinforcement of the one or more commands to autonomously control the one or more systems of the vehicle.

In some embodiments, the influential control component comprises a smart glove.

In some embodiments, the smart glove comprises an actuator adapted to at least one of contract and expand in response to stimuli.

In some embodiments, the at least one of the contraction and expansion of the actuator causes at least one of increasing strength of the driver's grip on the steering wheel, decreasing strength of the driver's grip on the steering wheel, gripping of the steering wheel via the driver's grip, and releasing the driver's grip on the steering wheel.

In some embodiments, gripping of the steering wheel or increasing the strength of the driver's grip on the steering wheel comprises augmentative influential control.

In some embodiments, releasing the driver's grip on the steering wheel or decreasing the strength of the driver's grip on the steering wheel comprises intervening influential control.

In some embodiments, the autonomous control system monitors the vehicle's operational response to the one or more commands to autonomously control the vehicle.

In some embodiments, the autonomous control system performs a comparison between the one or more commands to autonomously control the vehicle and the vehicle's operational response to the one or more commands to autonomously control the vehicle.

In some embodiments, the autonomous control system determines a differential between the one or more commands to autonomously control the vehicle and the vehicle's operational response to the one or more commands to autonomously control the vehicle, and wherein the imparting of the influential control is based on the determined differential.

In some embodiments, the imparting of the influential control based on the determined differential comprises imparting a level of influential control commensurate with the determined differential.

In some embodiments, the imparting of the level of influential control comprises altering strength of the driver's grip on the steering wheel.

In some embodiments, the one or more commands to autonomously control one or more systems of the vehicle comprise application of torque to the steering wheel.

In some embodiments, the imparting of influential control over the driver's grip on the steering wheel induces application of additional torque to the steering wheel by the driver.

In accordance with another embodiment, a vehicle may comprise a processor, and a memory unit operatively connected to the processor and including computer code, that when executed, causes the processor to: monitor autonomous control signals controlling motion of the vehicle; monitor vehicle's motion in response to the autonomous control signals; and apply influential control over a driver via a smart glove based on a differential between the monitored autonomous control signals and the monitored vehicle's motion in response to the autonomous control signals.

In some embodiments, the smart glove comprises an actuator adapted to at least one of contract and expand in response to stimuli.

In some embodiments, the at least one of the contraction and expansion of the actuator causes at least one of increasing strength of the driver's grip on the steering wheel, decreasing strength of the driver's grip on the steering wheel, gripping of the steering wheel via the driver's grip, and releasing the driver's grip on the steering wheel.

In some embodiments, gripping of the steering wheel or increasing the strength of the driver's grip on the steering wheel comprises augmentative influential control.

In some embodiments, releasing the driver's grip on the steering wheel or decreasing the strength of the driver's grip on the steering wheel comprises intervening influential control.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
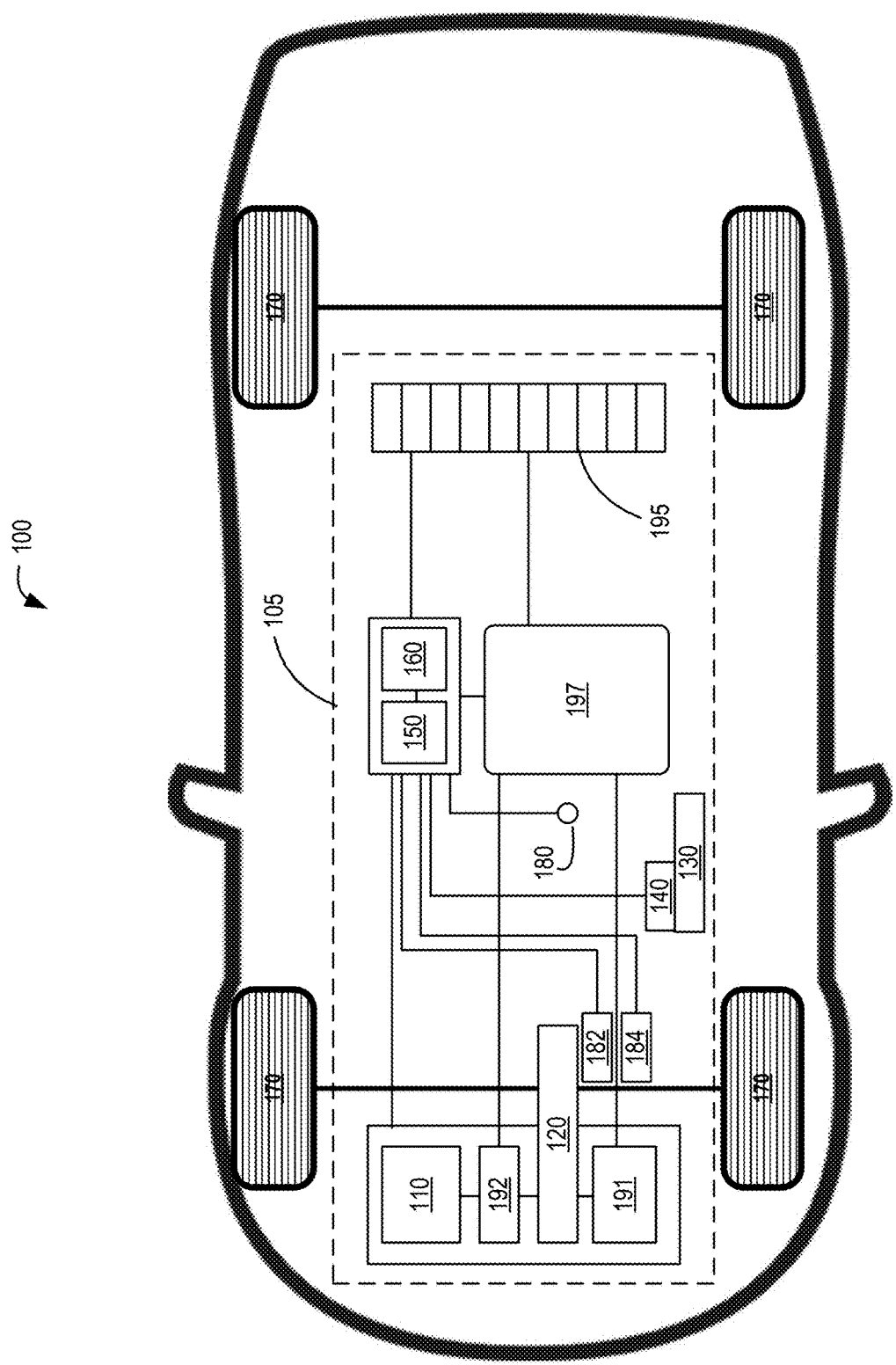
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

As alluded to above, ADAS and autonomous driving control systems can be used in vehicles that at least, in part, controls or manages vehicle operation to provide varying levels of automated control or assistance. For ease of reference, the term "autonomous control" will be used herein to refer to such systems. In some vehicles, an override mechanism, such as an override switch, may be used to turn off or disengage a vehicle's autonomous control system. Such an override mechanism can allow a driver/operator or passenger to assume manual control of a vehicle. When invoking conventional implementations of override mechanisms in a safety scenario (e.g., to avoid a collision), a vehicle operator engages in a human/manual situational assessment, and may intervene/override autonomous control by manually actuating a driving control mechanism, such as grasping and controlling a steering wheel, actuating a brake pedal, actuating a throttle pedal, and so on. In some vehicles, ADAS provide warning alerts or notifications to a driver, where these alerts/notifications are intended to invoke some reaction or response from the driver to, e.g., correct a current driving behavior.

It should be understood that the current (and a least a portion of a future) state of vehicular autonomous control may fall under what can be referred to as a transition period prior to the realization of fully autonomous driving. Thus, a human operator, i.e., a driver of a vehicle, may still inject some amount of control and/or may be prompted to take certain action(s), e.g., in response to some road or vehicle operating condition as alluded to above. Accordingly, embodiments of the present disclosure are directed to effectuating influential control over a driver of a vehicle. In the event a vehicle ADAS determines that influencing a driver to engage the vehicle in a particular way is warranted, one or more signals can be sent a wearable device, such as a glove worn by the driver. The one or more signals can provide influential control, e.g., augmentative or intervening control of the hand(s) of the driver vis-à-vis such a glove(s). In particular, such influential control may act as a reinforcement of some action(s) being promulgated by a vehicle ADAS, e.g., so that the driver of the vehicle may understand and appreciate the autonomous control being effectuated over the vehicle. In some embodiments, such influential control, alternatively, or in addition to the aforementioned reinforcement, may act to induce or prompt the driver to impart some complementary action(s) to existing ADAS-initiated control of the vehicle, or even in response to current driver-initiated control of the vehicle. In the event the driver's current action(s) do not comport with ADAS-effectuated control (or if the driver's current action(s) should be enhanced or augmented with additional action(s)/greater level of action(s)), such influential control can make the driver aware that his/her action(s) differ from the ADAS-effectuated control and/or intervene to induce or prompt the driver to stop his/her non-conforming action(s)/behavior(s).

For example, a vehicle may be approaching some obstacle in the road on which it is traversing. The driver of the vehicle may recognize a need to avert a collision with the approaching obstacle, and hence, may grip the vehicle's steering wheel to steer the car, e.g., to the right of the approaching obstacle. The ADAS may determine that a more severe turning radius may be necessary to avoid the approaching obstacle, in which case, an augmenting signal may be transmitted to the glove(s) causing the driver's hand(s) to more forcefully grip the steering wheel. In this way, the driver can be made aware that more force (in this case steering torque) should be applied to the steering wheel to avoid the approaching obstacle. Indeed, in some embodiments, effectuating greater grip may itself induce increased steering torque to be applied by the driver. By virtue of providing such augmented control, the driver can be better influenced and in a more direct manner. It should be understood that steering torque can be applied by the ADAS alone or by both the ADAS and the driver (in response to the influential, in this case augmented, control).

Current ADAS may effectuate vibrations in a driver's seat, may initiate the presentation of visual or audible warnings, e.g., flashing lights, beeps, etc. However, such current warnings can be more easily ignored by a driver. Some drivers may even find such warnings to be annoying, and may in some instances, disable this aspect of the ADAS. Moreover, following the above example, it can be appreciated that some drivers may view or experience conventional audible/visual alerts or warnings to be somewhat removed from the action/operation a current ADAS seeks to prompt. For example, conventional lane assist mechanisms may initiate vibration of the driver's seat to let the driver know that he/she is veering out of a particular lane. However, a vibrating seat is contextually unrelated to how a driver should steer vehicle. This disconnect can lead to driver annoyance, or worse, a driver ignoring a maneuver that should be performed to avoid a collision, accident, or other negative driving event.

In contrast, various embodiments, due to the direct nature of the influential control, i.e., influence over a driver's hand(s) that can directly control a vehicle vis-à-vis the steering wheel, may be better accepted by drivers. That is, a driver may better understand that he/she needs to apply more torque/turn more sharply in response to a control signal forcing increased grip on the steering wheel, as opposed to feeling a seat vibrate, hearing a "random" beep, etc. A driver may simply better understand why the ADAS or autonomous control of the vehicle involves a particular maneuver(s) by virtue of the influential control, making the driving experience more enjoyable, perceived to be less intrusive, etc. Over time, the driving behavior of a driver may be altered due to such influential control reinforcement.

It should be understood in some embodiments, influential control as contemplated herein may further include, but is not limited to and intervening control action. For example, in the event that a driver attempts to steer or otherwise control a vehicle in some manner contrary to an autonomous control-determined operation(s), some embodiments may effectuate intervening control. A scenario may arise where a vehicle may be approaching a moving road obstacle, such as another vehicle or bicycle. In response, the driver may attempt to turn right to avoid the road obstacle. The ADAS may determine that the vehicle should instead continue straight along its current path (rather than veer to the right) of the road obstacle, in which case, various embodiments may effectuate an influential control signal that comprises an intervening control signal. Such an intervening control signal may control the aforementioned glove(s) to effectuate a loosening of the user's grip on the steering wheel. In this way, the ADAS may effectively communicate, to the driver, that he/she is engaging in some action/operation that might be detrimental, is unwarranted, etc. That is, loosening the driver's grip on the steering can let the driver know he/she should not be operating the vehicle in a manner that the driver intends. Again, conventional systems and methods of influencing a driver may not be as effective as intended because the typical alerts do not involve one of a driver's closest point of control/contact with the vehicle—the steering wheel.

Moreover, effectuating a hand-based response can reduce latency/reaction time on the part of the driver. Again, conventional ADAS may present some form(s) of audible/visual warning. However, it may take the driver some time to: (a) pick up on the warning; (b) understand what the warning is for; and (c) engaging or initiating in some reactive/responsive action. Various embodiments may avoid such delays in reaction by directly influencing a driver's grip on/relative to a vehicle's steering wheel.

The systems and methods disclosed herein may be implemented with or by any of a number of different vehicles and vehicle types. For example, the systems and methods disclosed herein may be used with automobiles, trucks, motorcycles, recreational vehicles and other like on- or off-road vehicles. In addition, the principles disclosed herein may also extend to other vehicle types as well. An example hybrid electric vehicle is illustrated and described below as one example.

FIG. 1 illustrates an example hybrid electric vehicle (HEV) 100 in which various embodiments for driver disengagement of autonomous vehicle/driving controls may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1B). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode. The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed ($N_E$) of engine 110 independently of the vehicle speed (V).

ECU 150 may include circuitry to control the above aspects of vehicle operation. ECU 150 may include, for example, a microcomputer that includes a one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG 191. It should be understood that in embodiments where MG 191 and MG 192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG 191 during regenerative coasting and braking.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally, battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2A:
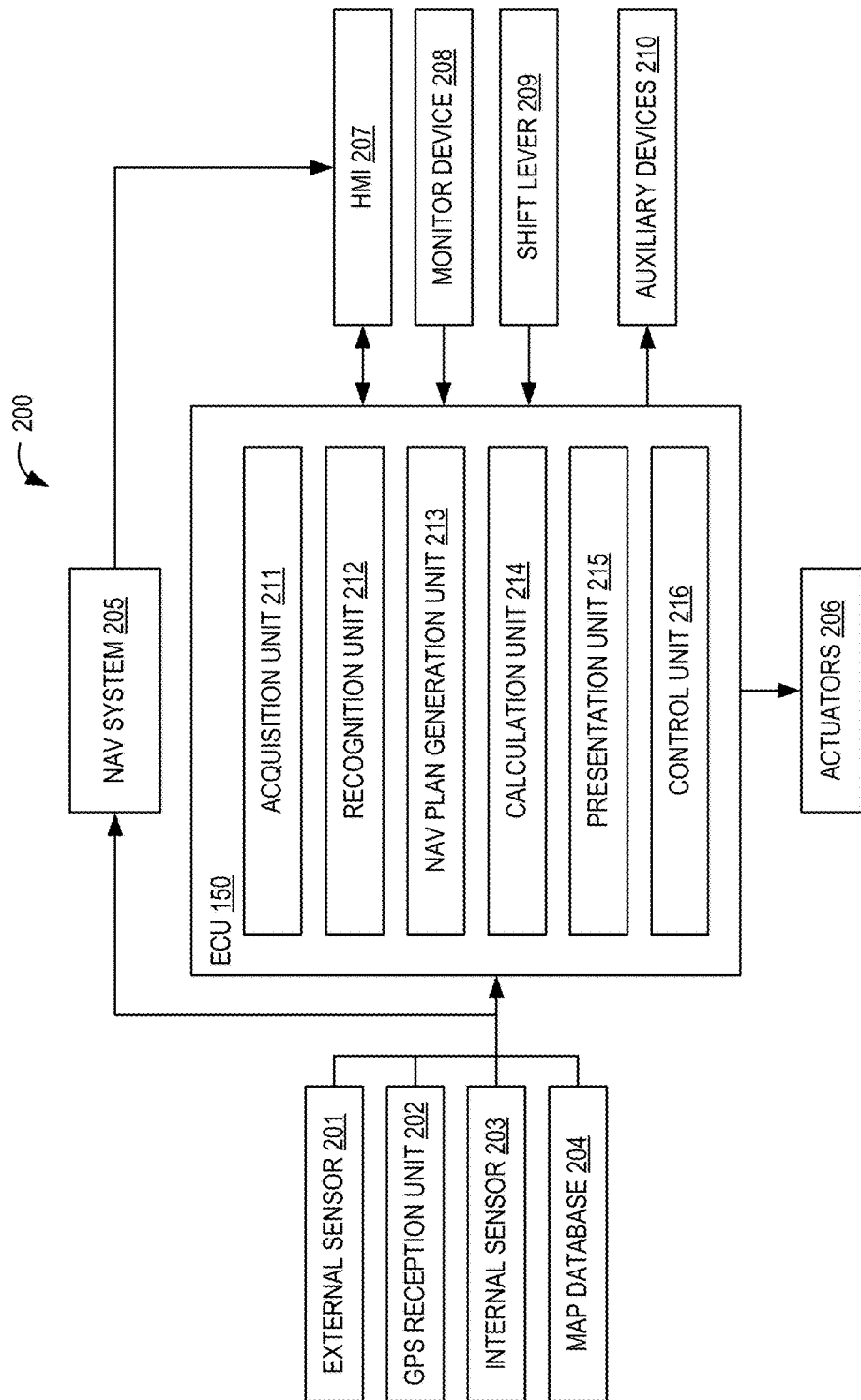
FIG. 2A illustrates an example autonomous control system.

FIG. 2A illustrates an example autonomous control system 200 that may be used to autonomously control a vehicle, e.g., HEV 100. Autonomous control system 200 may be installed in HEV 100, and executes autonomous control of HEV 100. As described herein, autonomous control can refer to control that executes driving/assistive driving operations such as acceleration, deceleration, and/or steering of a vehicle, general movement of the vehicle, without necessarily depending or relying on driving operations/directions by a driver or operator of the vehicle.

As an example, autonomous control may include lane keeping assist control where a steering wheel (not shown) is steered automatically (namely, without depending on a steering operation by the driver) such that HEV 100 does not depart from a running lane. That is, the steering wheel is automatically operated/controlled such that HEV 100 runs along the running lane, even when the driver does not perform any steering operation. As alluded to above, other autonomous control may include assistive driving mechanisms in the form of, e.g., visual or audible alerts or warnings, indirect haptic feedback, such as vibrating the driver's seat, etc.

As another example, autonomous control may include navigation control, where when there is no preceding vehicle in front of the HEV 100, constant speed (cruise) control is effectuated to make HEV 100 run at a predetermined constant speed. When there is a preceding vehicle in front of HEV 100, follow-up control is effectuated to adjust HEV 100's speed according to a distance between HEV 100 and the preceding vehicle.

In some scenarios, switching from autonomous control to manual driving may be executed. Whether or not to execute this switch from autonomous control to manual driving may be determined based on a comparison between a comparison target and a threshold. In one embodiment, the comparison target is quantified so as to be compared with the threshold. When the comparison target is equal to or more than the threshold, the autonomous control system 200 executes the switch from an autonomous control mode to a manual driving mode. In other situations/scenarios, autonomous control system 200 may take over operation, effecting a switch from manual driving/control to autonomous control. As will be discussed in greater detail below, autonomous control system 200 may make certain determinations regarding whether to comply or proceed with autonomous control based on a command from autonomous control system 200. For example, considerations regarding recoverability and vehicle control under certain conditions may be considered as factors in determining whether or not autonomous control can be safely executed. Such considerations may also be reflected as thresholds for comparison.

For example, when an operation amount of any of a steering operation, an acceleration operation, and brake operation by the driver of HEV 100 during the autonomous driving control becomes equal to or more than a threshold, autonomous control system 200 may execute a switch from autonomous control to manual control.

It should be understood that manual control or manual driving can refer to a vehicle operating status wherein a vehicle's operation is based mainly on driver-controlled operations/maneuvers. In an ADAS context, driving operation support control can be performed during manual driving. For example, a driver may be actively performing any of a steering operation, an acceleration operation, and a brake operation of the vehicle, while autonomous control apparatus 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver. It should be understood that in such scenarios, use of influential control over a driver's steering hand(s), because a driver is already engaging in a "proper" operation, may enforce or positively reinforce the driver's action(s).

In the example shown in FIG. 2A, autonomous control system 200 is provided with an external sensor 201, a GPS (Global Positioning System) reception unit 202, an internal sensor 203, a map database 204, a navigation system 205, actuators 206, an HMI (Human Machine Interface) 207, a monitor device 208, a shift lever 209, auxiliary devices 210. Autonomous control system 200 may communicate with ECU 150, or in some embodiments (may be implemented with its own ECU).

In the example shown in FIG. 2A, external sensor 201 is a detector that detects external circumstances such as surrounding information of HEV 100. The external sensor 201 may include at least one of a camera, a radar, and a Laser Imaging Detection and Ranging (LIDAR) unit.

The camera unit may be an imaging device that images the external circumstances surrounding the vehicle. For example, the camera is provided on a back side of a front windshield of the vehicle. The camera may be a monocular camera or a stereo camera. The camera outputs, to the ECU 150, image information on the external circumstances surrounding the vehicle. The camera is not limited to a visible light wavelength camera but can be an infrared camera.

The radar unit uses radio waves to detect obstacles outside of the vehicle by transmitting radio waves to the surroundings of the vehicle, and receiving reflected radio waves from an obstacle to detect the obstacle, distance to the obstacle or a relative positional direction of the obstacle. The radar unit outputs detected obstacle information to the ECU 150.

The LIDAR unit may operate similar to the manner in which the radar unit operates except that light is used in place of radio waves. The LIDAR unit outputs detected obstacle information to the ECU 150.

In the example shown in FIG. 2A, GPS reception unit 202 receives signals from three or more GPS satellites to obtain position information indicating a position of HEV 100. For example, the position information can include latitude information and longitude information. The GPS reception unit 202 outputs the measured position information of the vehicle to the ECU 150.

In the example shown in FIG. 2A, the internal sensor 203 is a detector for detecting information regarding, e.g., a running status of HEV 100, operational/operating conditions, e.g., amount of steering wheel actuation, rotation, angle, amount of acceleration, accelerator pedal depression, brake operation by the driver of HEV 100. The internal sensor 203 includes at least one of a vehicle speed sensor, an acceleration sensor, and a yaw rate sensor. Moreover, internal sensor 203 may include at least one of a steering sensor, an accelerator pedal sensor, and a brake pedal sensor.

A vehicle speed sensor is a detector that detects a speed of the HEV 100. In some embodiments, HEV 100's speed may be measured directly or through calculations/inference depending on the operating conditions/status of one or more other components of HEV 100. For example, a wheel speed sensor can be used as the vehicle speed sensor to detect a rotational speed of the wheel, which can be outputted to ECU 150.

The acceleration sensor can be a detector that detects an acceleration of the vehicle. For example, the acceleration sensor may include a longitudinal acceleration sensor for detecting a longitudinal acceleration of HEV 100, and a lateral acceleration sensor for detecting a lateral acceleration of HEV 100. The acceleration sensor outputs, to the ECU 150, acceleration information.

The yaw rate sensor can be a detector that detects a yaw rate (rotation angular velocity) around a vertical axis passing through the center of gravity of HEV 100. For example, a gyroscopic sensor is used as the yaw rate sensor. The yaw rate sensor outputs, to the ECU 150, yaw rate information including the yaw rate of HEV 100.

The steering sensor may be a detector that detects an amount of a steering operation/actuation with respect to a steering wheel 30 by the driver of HEV 100. The steering operation amount detected by the steering sensor may be a steering angle of the steering wheel or a steering torque applied to the steering wheel, for example. The steering sensor outputs, to the ECU 150, information including the steering angle of the steering wheel or the steering torque applied to the steering wheel of HEV 100.

The accelerator pedal sensor may be a detector that detects a stroke amount of an accelerator pedal, for example, a pedal position of the accelerator pedal with respect to a reference position. The reference position may be a fixed position or a variable position depending on a determined parameter. The accelerator pedal sensor is provided to a shaft portion of the accelerator pedal AP of the vehicle, for example. The accelerator pedal sensor outputs, to the ECU 150, operation information reflecting the stroke amount of the accelerator pedal.

The brake pedal sensor may be a detector that detects a stroke amount of a brake pedal, for example, a pedal position of the brake pedal with respect to a reference position. Like the accelerator position, a brake pedal reference position may be a fixed position or a variable position depending on a determined parameter. The brake pedal sensor may detect an operation force of the brake pedal (e.g. force on the brake pedal, oil pressure of a master cylinder, and so on). The brake pedal sensor outputs, to the ECU 150, operation information reflecting the stroke amount or the operation force of the brake pedal.

A map database 204 may be a database including map information. The map database 204 is implemented, for example, in a disk drive or other memory installed in HEV 100. The map information may include road position information, road shape information, intersection position information, and fork position information, for example. The road shape information may include information regarding a road type such as a curve and a straight line, and a curvature angle of the curve. When autonomous control system 200 uses a Simultaneous Localization and Mapping (SLAM) technology or position information of blocking structural objects such as buildings and walls, the map information may further include an output signal from external sensor 201. In some embodiments, map database 204 may be a remote data base or repository with which HEV 100 communicates.

Navigation system 205 may be a component or series of interoperating components that guides the driver of HEV 100 to a destination on a map designated by the driver of HEV 100. For example, navigation system 205 may calculate a route followed or to be followed by HEV 100, based on the position information of HEV 100 measured by GPS reception unit 202 and map information of map database 204. The route may indicate a running lane of a section(s) of roadway in which HEV 100 traverses, for example. Navigation system 205 calculates a target route from the current position of HEV 100 to the destination, and notifies the driver of the target route through a display, e.g., a display of a head unit, HMI 207 (described below), and/or via audio through a speaker(s) for example. The navigation system 205 outputs, to the ECU 150, information of the target route for HEV 100. In some embodiments, navigation system 205 may use information stored in a remote database, like map database 204, and/or some information processing center with which HEV 100 can communicate. A part of the processing executed by the navigation system 205 may be executed remotely as well.

Actuators 206 may be devices that execute running controls of HEV 100. The actuators 206 may include, for example, a throttle actuator, a brake actuator, and a steering actuator. For example, the throttle actuator controls, in accordance with a control signal output from the ECU 150, an amount by which to open the throttle of HEV 100 to control a driving force (the engine) of HEV 100. In another example, actuators 206 may include one or more of MGs 191 and 192, where a control signal is supplied from the ECU 150 to MGs 191 and/or 192 to output motive force/energy. The brake actuator controls, in accordance with a control signal output from the ECU 150, the amount of braking force to be applied to each wheel of the vehicle, for example, by a hydraulic brake system. The steering actuator controls, in accordance with a control signal output from the ECU 150, driving an assist motor of an electric power steering system that controls steering torque.

HMI 207 may be an interface used for communicating information between a passenger(s) (including the operator) of HEV 100 and autonomous control system 200. For example, the HMI 207 may include a display panel for displaying image information for the passenger(s), a speaker for outputting audio information, and operation buttons or a touch panel used by the occupant for performing an input operation. HMI 207 may also or alternatively transmit the information to the passenger(s) through a mobile information terminal connected wirelessly and receive the input operation by the passenger(s) through the mobile information terminal.

Monitor device 208 monitors a status of the driver/operator. The monitor device 208 can check a manual driving preparation state of the driver. More specifically, the monitor device 208 can check, for example, whether or not the driver is ready to start manual operation of HEV 100. Moreover, the monitor device 208 can check, for example, whether or not the driver has some intention of switching HEV 100 to a manual mode of operation.

For example, the monitor device 208 may be a camera that can take an image of the driver, where the image can be used for estimating the degree to which the driver's eyes are open, the direction of the driver's gaze, whether or not the driver is holding the steering wheel, etc. Monitor device 208 may also be a pressure sensor for detecting the amount of pressure the driver's hand(s) are applying to the steering wheel. As another example, the monitor device 208 can be a camera that takes an image of a hand of the driver.

A shift lever 209 can be positioned at a shift position, e.g., "A (AUTOMATIC)," "D (DRIVE)," etc. The shift position "A" indicates, for example, an automatic engage mode where autonomous control is engaged automatically. The shift position "D" indicates a triggered engage mode where autonomous control is engaged in response to a driver-initiated request to operate HEV 100 in an autonomous driving mode.

Auxiliary devices 210 may include devices that can be operated by the driver of the vehicle, but are not necessarily drive-related, such as actuators 206. For example, auxiliary devices 210 may include a direction indicator, a headlight, a windshield wiper and the like.

ECU 150 may execute autonomous control of the vehicle, and may include an acquisition unit 211, a recognition unit 212, a navigation plan generation unit 213, a calculation unit 214, a presentation unit 215, and a control unit 216.

Acquisition unit 211 may obtain the following operation amounts or levels of actuation based on the information obtained by the internal sensor 203: steering operation, acceleration operation, and brake operation by the driver during an autonomous control mode; and the level of steering operation, acceleration operation, and brake operation by the driver of the vehicle during a manual control mode.

Recognition unit 212 may recognize or assess the environment surrounding or neighboring HEV 100 based on the information obtained by the external sensor 201, the GPS reception unit 202, and/or the map database 204. For example, the recognition unit 212 includes an obstacle recognition unit (not shown), a road width recognition unit (not shown), and a facility recognition unit (not shown). The obstacle recognition unit recognizes, based on the information obtained by the external sensor 201, obstacles surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle can refer to a property of the obstacle such as hardness and a shape of the obstacle.

The road width recognition unit recognizes, based on the information obtained by the external sensor 201, the GPS reception unit 202, and/or the map database 204, a road width of a road in which the vehicle is running.

The facility recognition unit recognizes, based on the map information obtained from the map database 204 and/or the vehicle position information obtained by the GPS reception unit 202, whether or not HEV 100 is operating/being driven through an intersection, in a parking structure, etc. The facility recognition unit may recognize, based on the map information and the vehicle position information, whether or not the vehicle is running in a school zone, near a childcare facility, near a school, or near a park, etc.

Navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The navigation plan may be reflect one or more operating conditions/controls to effectuate the target route. For example, the navigation plan can include a target speed, a target acceleration, a target deceleration, a target direction, and/or a target steering angle with which HEV 100 should be operated at any point(s) along the target route so that the target route can be achieved to reach a desired destination. It should be understood that navigation plan generation unit 213 generates the navigation plan such that HEV 100 operates along the target route while satisfying one or more criteria and/or constraints, including, for example, safety constraints, legal compliance rules, operating (fuel/energy) efficiency, and the like. Moreover, based on the existence of obstacles surrounding HEV 100, the navigation plan generation unit 213 generates the navigation plan for the vehicle so as to avoid contact with such obstacles.

Calculation unit 214 may calculate a threshold used for determining whether or not to switch from autonomous control to manual driving or vice versa. The determination can be performed based on the operating levels associated with the manner in which the driver is operating HEV 100 during autonomous control which is obtained by the acquisition unit 211. For example, the driver of HEV 100 may suddenly grasp the steering wheel (which can be sensed by internal sensor 203) and stomp on the brake pedal (which can be sensed by monitor device 208). The pressure on the steering wheel and the level of actuation of the brake pedal may be excessive enough (exceed a threshold) suggesting that the driver intends to override the autonomous control system 200.

Presentation unit 215 displays, on a display of the HMI 207, a threshold which is calculated by the calculation unit 214 and used for determining whether or not to execute the switching from autonomous control to the manual driving or vice versa.

Control unit 216 can autonomously control HEV 100 based on the navigation plan generated by navigation plan generation unit 213. The control unit 216 outputs, to the actuators 206, control signals according to the navigation plan. That is, the control unit 216 controls actuators 206 based on the navigation plan, and thereby autonomous control of HEV 100 is executed/achieved. Moreover, certain levels of operation, e.g., steering wheel actuation, by the driver can be detected by the acquisition unit 211. When such level(s) equal or exceed the threshold calculated by the calculation unit 214 in a period during which autonomous control is being used to operate HEV 100, control unit 216 executes a switching from autonomous control to manual control.

Figure 2B:
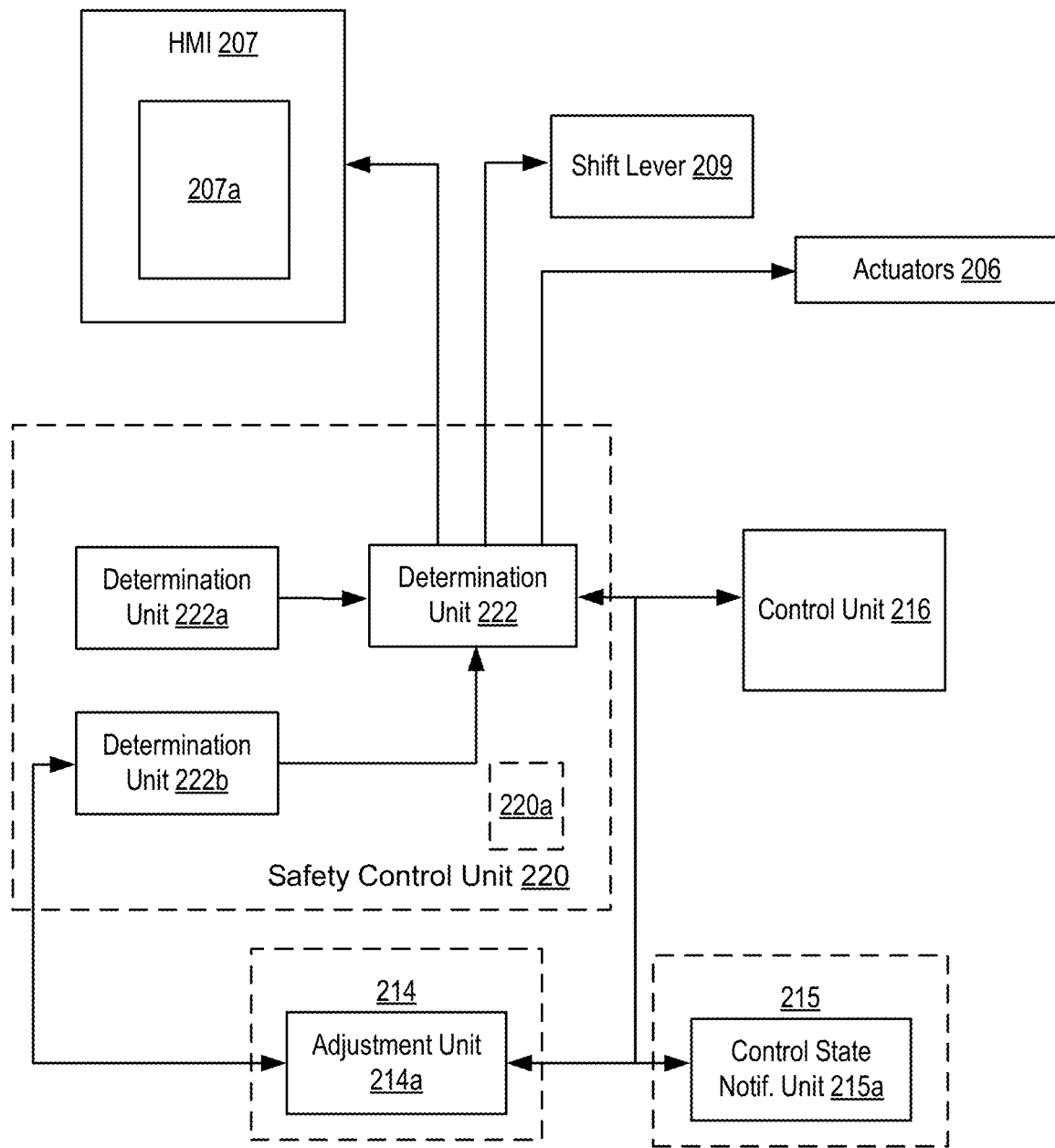
FIG. 2B illustrates an example safety control unit aspect of the autonomous control system of FIG. 2A.

Referring to FIG. 2B, control unit 216 operatively interacts with safety control unit 220 that determines whether or not autonomous control system 200 (in particular, control unit 216) can engage (activate, start) in autonomous control of HEV 100. For example, safety control unit 220 may include one or more determination units, e.g., determination unit 222a determines whether or not autonomous control can be engaged, based on a difference between a vehicle position calculated from signals received by the GPS reception unit 202 and an actual vehicle position calculated based on an output signal from the external sensor 201, the map information of the map database 204 and so forth. For example, a threshold condition associated with engagement of autonomous control in HEV 100 may be predicated on travel along a certain type of roadway, e.g., known segment(s) of road within map database 204, such as a freeway (versus) country lane. Road curvature may be another condition/characteristic on which autonomous control of HEV 100 may be based.

Determination unit 222a may make its determination based on one or more determinative factors.

Control unit 216 may further interact with a determination unit 222b of safety control unit 220 that determines whether or not a trigger to deactivate (stop) an autonomous control mode exists. For example, determination unit 222b can determine whether or not to execute the switch from the autonomous control to manual control based on the level of steering wheel actuation, brake pedal actuation, etc. effectuated by the driver while HEV 100 is being operated in an autonomous control mode, which is obtained by the acquisition unit 211. Other determinative factors or considerations may be the amount of acceleration or deceleration experienced by HEV 100, also determined by acquisition unit 211. When determination unit 222 determines that the autonomous control can be engaged, based on the determinations performed by determination units 222a and/or 222b, control unit 216 engages autonomous control of HEV 100. That is, determination unit 222 may act as a determination aggregator that aggregates determinations rendered by other determination units. Determination unit 222 may be a circuit, e.g., application-specific integrated circuit, logic, software, or some combination thereof that processes the individual determinations rendered by the other determination units (e.g., determination units 222a and 222b) to render an overall determination. That overall determination may control operation of control unit 216, e.g., to disengage autonomous control and switch to manual control or engage in autonomous control.

On the other hand, when determination units 222a and/or 222b determine that a switch from autonomous control to the manual control should be executed, autonomous control is deactivated/disengaged by control unit 216 or control unit 216 is itself deactivated/disengaged, and the driver proceeds to manually control HEV 100. It should be understood that other determination units may be used (or only a single determination unit may be used). In the case of multiple determination units being used, in some embodiments, any single determination that manual control should be executed can serve as a trigger to deactivate autonomous control. In some embodiments, presentation unit 215 is provided with a control state notification unit 215a that notifies the driver of a fact that HEV 100 is operating under autonomous control is in execution, and so forth. Such a notification may be displayed on a display of HMI 207, for example. Likewise, If a switch from autonomous control to the manual control is executed, the control state notification unit 215a displays, on the display of HMI 207 a corresponding notification.

HMI 207, in some embodiments, may include an autonomous control engagement trigger input unit 207a that can be actuated by the driver of HEV 100 to engage in an autonomous control mode (after safety control unit 220 determines that autonomous control can be effectuated).

In some embodiments, the driver of HEV 100 may be able to select an automatic autonomous control engage mode, where autonomous control unit 216 can be automatically engaged when safety control unit 220 determines that the autonomous control can be engaged. In some embodiments, shift lever 209 may be used to set a triggered autonomous control mode and an automatic engage mode (as alluded to above by actuating shift lever 209 to an "A" (AUTOMATIC) position or to a "D" (DRIVE) position.

Figure 3:
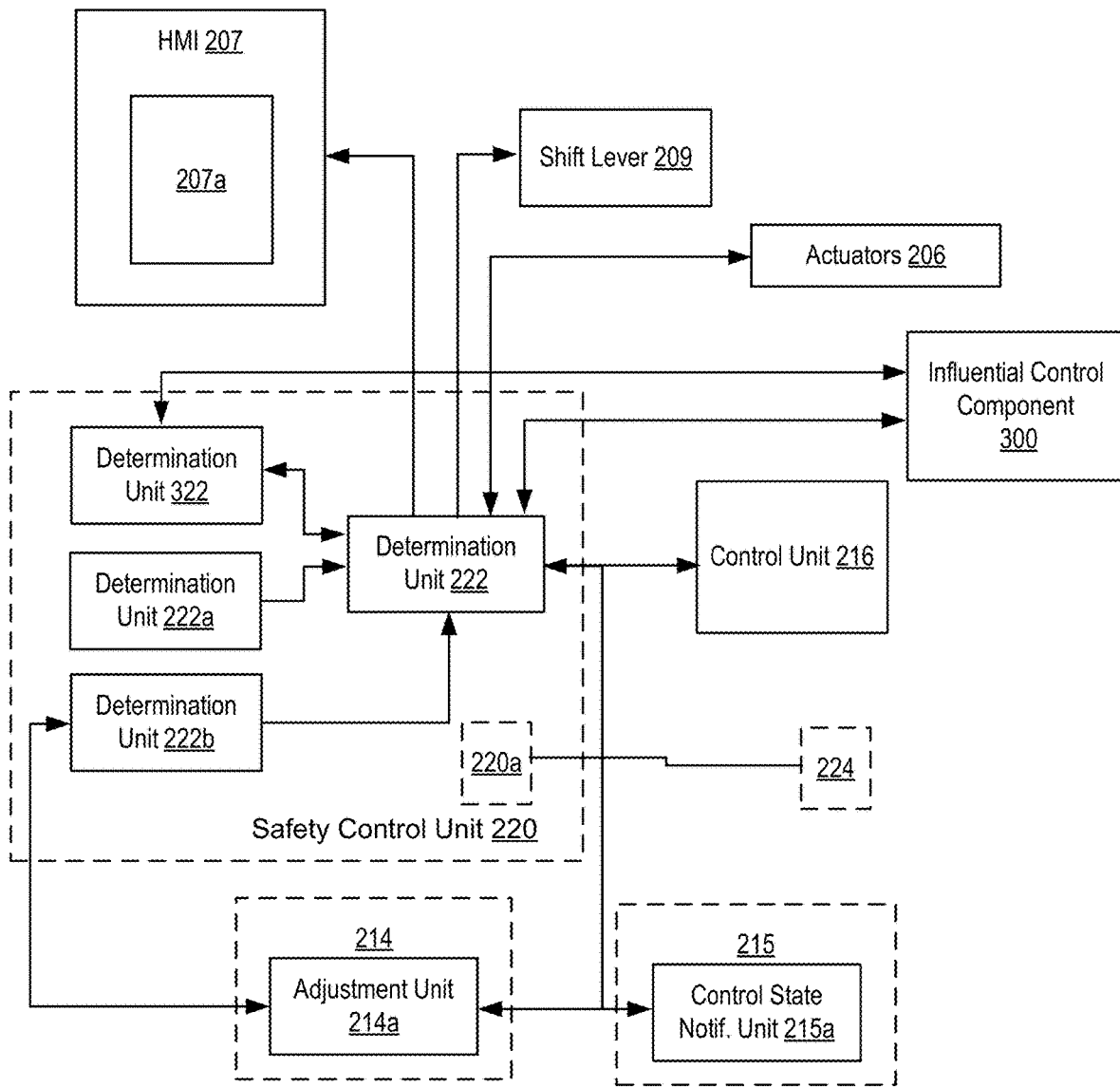
FIG. 3 illustrates an example influential control mechanism in accordance with various embodiments.

As alluded to above, an influential control mechanism may be used to effectuate influential control over a driver's use of an actuator, e.g., a steering wheel. FIG. 3 illustrates an example implementation of such an influential control mechanism. That is, in addition the above-described components and functionality of autonomous control system 200, FIG. 3 illustrates an influential control component 300 that is operatively connected to determination unit 222, which in turn is operatively connected to determining unit 322.

Figure 4A:
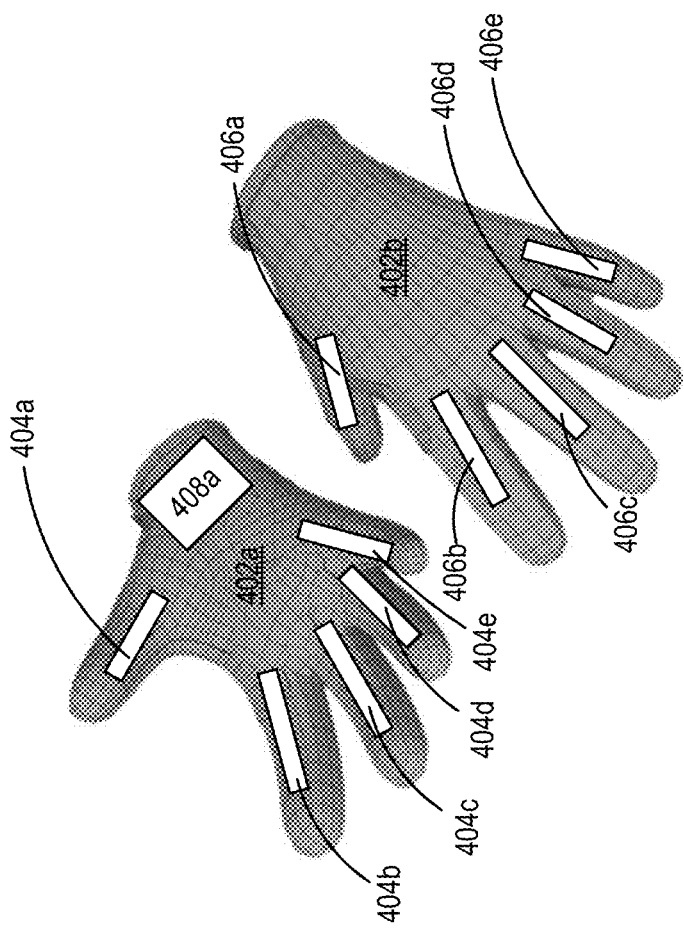
FIGS. 4A and 4B illustrate an example smart glove(s) used to effectuate influential control in accordance with one embodiment.
Figure 4A:
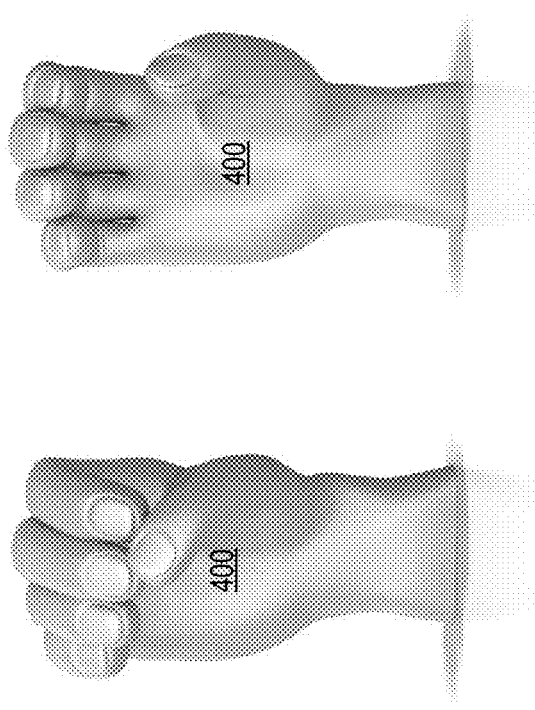

Determination unit 322, like the other determination units 222, 222a, and/or 222b, may comprise logic, circuitry, software, or some combination thereof effectuating processing and determining capabilities described in conjunction with FIG. 4. Information regarding the actuation or intended actuation of one of actuators 206, such as a steering wheel actuator may be transmitted to determination unit 322 via determination unit 222.

Determination unit 322 may comprise logic that upon receiving a signal or notification that an actuator 206 is being actuated or operated in some way, determines whether augmented or intervening control should be effectuated for the driver. In some embodiments, such signals or notifications may simply be used to trigger an augmented control response in the form of a signal to influential control component 300, e.g., a smart glove(s) worn by the driver). The signal instructs or causes influential control component 300 to, in this case strengthen the driver's grip on the steering wheel, or initiate gripping of the steering wheel. In some embodiments, such signals or notifications may be used to trigger an intervening control response in the form of a signal to influential control component 300, again a smart glove(s). In this case, the signal may instruct or cause influential control component 300 to release the driver's grip on the steering wheel or reduce the strength of the driver's grip on the steering wheel.

In some embodiments, determination unit 322 may transmit such signals or notifications in response to an indication/signal/notification regarding the actuation of one or more actuators 206, such as actuation of a steering wheel. In some embodiments, determination unit 322 may compare feedback regarding actual actuation of one or more actuators 206 and intended actuation (e.g., control signals output by control unit 216). If the comparison indicates that a level of actual actuation of actuators 206 does not meet the level of the intended actuation, determination unit 322 may transmit augmenting signals to influential control component 300 to prompt the driver to exert a greater level of actuation.

In some embodiments, as noted above, the augmenting signals are meant to reinforce compliance with or understanding of the current actuation or operation (or level(s) thereof) of actuators 206. For example, navigating a turn may take one second, during which control unit 216 sends a plurality of control signals to iteratively control a vehicle as it turns. During the time period of the turn, determination unit 322 may, in response to control unit 216 signals sent to actuators 206 vis-à-vis determination unit 222 compare the control unit 216 signals with actuation feedback from actuators 206. As the turn as being navigated, such comparisons may indicate actuators 206, e.g., a steering wheel actuator should continue to turn (apply steering torque in a particular direction in accordance with a certain level of actuation/angle of rotation). Accordingly, determination unit 322 may signal influential control component 300 to induce gripping of the steering wheel. In some instances, determination unit 222 may receive information from other units, e.g., recognition unit 212, navigation plan generation unit 213, calculation unit 214, etc. (or feedback from influential control component 300 or actuators 206), that the vehicle is in some way, not moving or acting/reacting in a desired manner. In response to such a determination, determination unit 322 may signal influential control component 300 to, e.g., prompt the driver to release his/her grip on the steering wheel.

In some embodiments, calculation unit 214 may calculate one or more thresholds against which determination unit 322 may compare its received information, feedback, etc. to determine whether or not to instruct influential control component 300 to effectuate augmented control or intervention control. Following a previous example, the driver of HEV 100 may suddenly grasp the steering wheel (which can be sensed by internal sensor 203). The pressure on the steering wheel and the level of actuation of the steering wheel may be excessive enough (exceeds a threshold) suggesting that the driver intends to override the autonomous control system 200. If a determination is made, e.g., by safety control unit 220, one or more other determination units, or some combination thereof, that the driver's intend action(s) is not warranted or would result in some negative event, determination unit 322 may signal to influential control component 300 to impart intervening control. In some embodiments, intervening control may be embodied by influential control component 300, e.g., a smart glove, to force or induce the driver to release or lessen his/her grip on the steering wheel.

It should be understood that various algorithms, methods, mechanisms for determining how/when to impart influential control on a driver by way of influential control component 300. Such algorithms, methods, mechanisms may be programmable via safety control unit 220 and one or more of its determination units, and various embodiments contemplate the incorporation of such algorithms, methods, mechanisms to achieve the desired influential control. It should be understood that scope of the present application contemplates such a variety of such algorithms, methods, and mechanisms for effectuating influential control/upon which influential control may be based through an influential control component 300, such as a smart glove that can effect a driver's grip on a steering wheel.

It should also be noted that influential control can be effectuated through more fine-grained control. For example, in some embodiments, grip, via influential control component 300 can be increased or reduced. However, in some embodiments, influential control component 300 can be controlled in accordance with series of operations. For example, in some embodiments, influential control component 300 may comprise a pair of gloves, and determination unit 322 may signal influential control component 300 to actuate only one of the pair of gloves. That is, in a turn navigation scenario, reinforcing a right turn may be accomplished by determination unit 322 controlling influential control component 300 to actuate only the right handed smart glove being worn by the driver.

Data collection at a memory unit 220a of safety control unit 220, e.g., a cache, a data repository, log, etc. may comprise continual receipt and storing/logging of information regarding the commands that control unit 216 is sending. Memory unit 220a may also store/log information regarding activation of influential control component 300. In some embodiments, memory unit 220a may offload stored information to a remote data store, e.g., data store 224. Thus, any processing of autonomous control data can include both command information from control unit 216 regarding autonomous control operations, e.g., commands to move HEV 100, along with information regarding when or how influential control component 300 was activated, to what extent, and so on. Such information can be useful in determining, e.g., erroneous or potentially erroneous operation of autonomous control system 200 that would otherwise be lost in conventional systems where simple disengagement of autonomous control actually prevents autonomous control systems from operating at all, including sending autonomous control commands. Such information can also be useful in determining, e.g., expected driver response(s) to certain road obstacles, road conditions, actuation of actuators 206, and so on. Such information can be used to develop or refine the underlying logic (algorithms, methods, mechanisms) for controlling how/when influential control component 300 is to be activated and to what extent/level, that may be implemented in safety control unit 220, determination unit 322, control unit 216, etc.

In some embodiments, data collection can comprise monitoring the operation of autonomous control system or aspects thereof, e.g., control unit 216 over time. Thus, the aforementioned data/information that is stored/logged can include time-series data involving some subset of or all aspects of autonomous control system 200. For example, commands from control unit 216 to actuators 206 may be monitored, and time-series data representative of the operating states/conditions of control unit 216 may be captured. For example, time-series data may be collected which includes not only the commands/operating conditions or characteristics of control unit 216, but also determination units 222, 222a, 222b, 322, external sensor 201, GPS reception unit 202, and so on.

As alluded to above, in some embodiments, influential control component 300 may comprise one or more smart gloves. FIG. 4A illustrates an example of such smart gloves 402a and 402b capable of imparting influential control over a hand(s) wearing smart glove 402. As illustrated in FIG. 4A, a driver's hand(s), e.g., hand 400, may be influenced resulting in the closing/opening of the driver's grip. Smart gloves 402a, 402b may comprise wearable gloves in/on which one or more actuators may be implemented. In the example smart glove 402a, each digit may have a corresponding set of actuators, a first set of actuators 404a-e may be implemented along a palm-side surface(s) of smart glove 402a. The first set of actuators 404a-e may be configured to, e.g., contract, which when worn on driver's hand 400, influences hand 400 to close the fingers around or grip an object, such a steering wheel. In this example, smart glove 402b, a second set of actuators 406a-406e may be implemented along a back surface(s) of smart glove 402b. In this way, the second set of actuators may contract, inducing an opening of the digits of a driver's hand, resulting in reducing the grip strength or level of grip of that hand. It should be understood that only a palm surface of smart glove 402a is illustrated to show an example orientation of a first set of actuators, while a back-of-hand surface of smart glove 402b is illustrated to show an example orientation of a second set of actuators. In some embodiments, each glove, e.g., each of smart gloves 402a and 402b include respective first and second sets of actuators.

It should be understood that a smart glove, such as smart glove 402a may be configured in different ways to achieve the requisite grip/opening of hand 400. For example, smart glove 402a need not necessarily completely cover the fingers of hand 400. For example, only some, not necessarily all of the digits of hand 400 may have a corresponding actuator, e.g., actuators 404a-d may be implemented, but not actuator 404e. In some embodiments, only a single set of actuators may be utilized. For example, actuators 404a-404e may configured to have a "rest" or default state. From that default state, in accordance with some stimuli (e.g., control signals from determination component 322), actuators 404a-

404e can be made to contract (closing the digits of hand 400 to effectuate a grip/stronger grip) as well as to expand/extend (forcing the digits of hand 400 to open/reduce grip strength). In some embodiments, one or more actuators may be "built into" the fabric of smart glove 402a, or the fabric itself may have actuator/actuator-like properties that can be controlled via some form of stimuli. Some embodiments are described in greater detail below, although it should be understood that such embodiments are not limiting, and that the present disclosure contemplates the use of most any type of glove(s) able to influence the manner in which a hand(s) operate.

In some embodiments, one or more of actuators 404a-3 and 406a-e may comprise cable linkages, rigid linkages, tubing, and the like operating in conjunction with one or more motors, linear actuators, rotational actuators, etc. in order to transmit a motive force to one or more digits of a hand, such as hand 400. In some embodiments, one or more of actuators 404a-e and 406a-e may comprise compliant mechanisms having one or more parts constructed of compliant materials and/or elastomeric materials. Non-limiting examples of the types of compliant materials that may be used include liquid crystal elastomers (LCEs), shape-memory alloys (SMAS), electroactive polymers (EAPs), piezoelectric materials, magnetic shape memory alloys, temperature-responsive polymers, ferrofluids, photomechanical materials, dielectric elastomers (DEs), among others. As a non-limiting example, an actuator can be constructed of several rigid structures connected by a plurality of hinges made of complaint materials. When a stimulus is applied to the compliant material hinges, the hinges are configured to change shape and/or size to cause the actuator to change from a first shape to a second shape (or to a third or other further shapes), the transformation resulting in a force being applied to cause hand 400 to grip, release its grip, etc. For example, as illustrated in FIG. 4B, determination unit 322 may transmit a signal(s) to smart gloves 402a and 402b to effectuate augmented control over the hands of a driver to grip steering wheel 410.

A smart glove, such as smart glove 402a may further comprise a glove control system 408a, which may comprise one or more communication circuits or elements that may allow for wired or wireless communication with autonomous control system 200 or one or more elements thereof including, e.g., safety control unit 220, one or more determination units, etc. For example, glove control system 408a may comprise a wireless transceiver with an associated antenna or a wired I/O interface with an associated hard-wired data port (not illustrated). Accordingly, control signals for actuating one or more of actuators 404a-e and 406a-e may be received via glove control system 408a. In some embodiments, a single glove control system, such as glove control system 408a may provide control over a pair of smart gloves, e.g., smart gloves 402a, 402b. In other embodiments, each smart glove may have a corresponding glove control system. In some embodiments, glove control system 408a may be implemented remotely from smart glove(s) 402a/402b, such as within or part of a vehicle, e.g., as part of steering wheel 410.

Figure 4B:
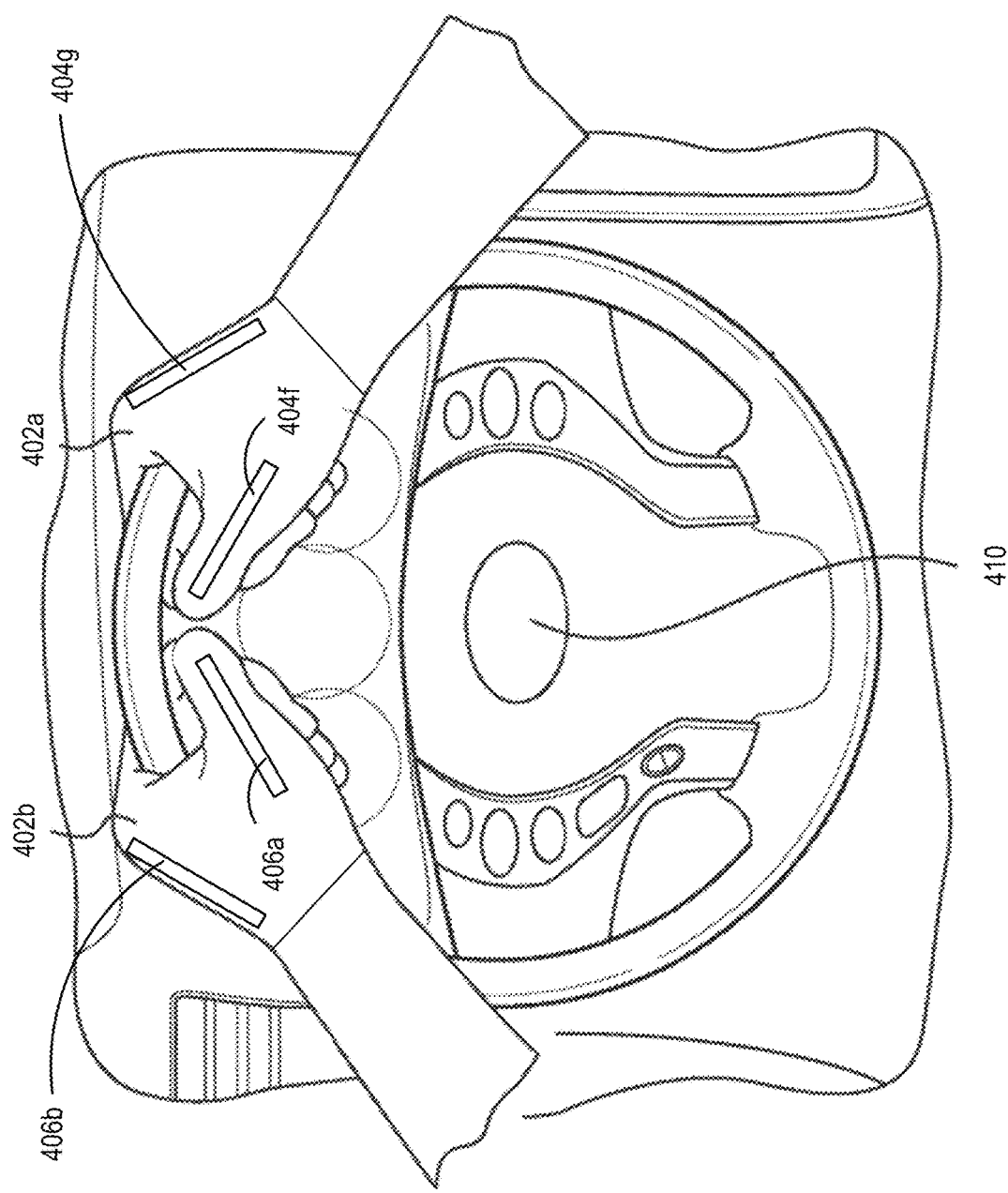

In some embodiments, glove control system 408a may comprise inductive coupling circuitry/elements that allow actuation/de-actuation of smart glove 402a through contact or near-contact with a vehicle component or element, such as a steering wheel, e.g., steering wheel 410 (FIG. 4B). For example, steering wheel 410 may include a first conductor(s) that may operatively couple with a second conductor(s), such as one or more of actuators 404a-j (404f and 404g are shown), for example. A change in current in the first conductor, which can be in response to a control signal from determination unit 322 requiring augmented control, may induce voltage in the second conductor(s) through electromotive induction inducing electromotive force in the one or more actuators 404a-e.

Glove control system 408a may further comprise a battery/power element (not shown) for powering smart glove 402a. In some embodiments, charging/re-charging of smart glove 402a may also be effectuated through inductive coupling. In some embodiments, the battery of smart glove 402a may be a low voltage battery having exposed leads that complete a circuit with steering wheel 410, where the driver's body may act as a circuit ground or negative pole. In some embodiments, smart glove 402a may only be operative upon contact or near-contact with a corresponding conductor, such as steering wheel 410. In some embodiments, an internal sensor 203, such as an in-vehicle camera may visually sense when smart glove 402a is in operative proximity (e.g., close enough to effectuate/warrant operation of smart glove 402) of steering wheel 410. In response, determination unit 322 may activate smart glove 402a so that it may receive a subsequent control signal(s) to actuate one or more actuators 404a-e, 406a-e of smart glove 402a.

In some embodiments, glove control system 408a may comprise one or more sensors to monitor operation of smart glove 402a (not shown). Such sensors may provide the aforementioned feedback to determination unit 322 so that the amount of grip or lack thereof can be communicated to autonomous control system 200, and appropriate action can be taken. In other words, such sensors are able to determine a current state of smart glove 402a, which in some embodiments reflects some amount or level of grip being applied by hand 400 to steering wheel 410. In response to one or more control signals from determination unit 322, for example, and based on the level of grip/lack of grip monitored/determined by the sensors, an appropriate amount or level of influential control can be applied vis-à-vis actuators 404a-e/406a-e. In some embodiments, actuators 404a-e, 406a-e may be sensors in their own right, e.g., sensing their own respective levels of distortion, e.g., contraction or expansion.

In some embodiments, steering wheel 410 may be configured with one or more sensors that are able to detect the amount of pressure, the amount of contact, etc. that smart glove 402a may have with steering wheel 410. For example, the sensors, when implemented, e.g., on a surface of the steering wheel 410 may be able to detect how much of smart glove 402a is in contact with steering wheel 410, which in turn may be treated as an indicator of how firm or loose the driver's grip may be. It should be understood that in some embodiments, no sensors are necessarily required. Determination unit 322 may simply instruct smart glove 402a to grip or release its grip without a need to ascertain current state of the grip or lack thereof on steering wheel 410.

Depending on a current state of grip, determination unit 322 may transmit one or more control signals to smart glove 402a (an embodiment of influential control component 300 of FIG. 3) to effectuate a desired amount of grip or a desired reduction in grip strength. For example, and as discussed above, control unit 216 may, based on input/analysis regarding road conditions (current, past, future), environmental considerations, target route, destination, and the like, output one or more control signals to actuators 206 to effectuate desired autonomous or semi-autonomous control over vehicle 100. Determination unit 322 may compare the intended autonomous or semi-autonomous control aspects, e.g., amount of forward motive force, turning radius and corresponding steering wheel torque/rotational angle, etc., to current vehicle operating characteristics regarding those same aspects, e.g., current amount of forward motive force, current amount of steering wheel torque being applied, current rotational angle, etc. In this way, determination unit 322 is able to ascertain whether or not vehicle 100 is behaving in accordance with the behavior intended by control unit 216/autonomous control system 200.

To reinforce the intended and actual operation of vehicle 100, as noted above, smart glove 402a may be actuated to grip, increase grip, loosen grip, etc. on steering wheel 410. If the actual operation of vehicle 100 does not comport with the intended operation of vehicle 100 (per autonomous control system 200/control unit 216), determination unit 322 may transmit one or more control signals to counteract the current forward motive force, current steering wheel torque/rotational angle, etc. This may also indicate to the driver that he/she may not be operating vehicle 100 as is intended/should be operated. The amount by which grip is effectuated, increased, lessened, or released may be calculated, e.g., in conjunction with calculation unit 214. In some embodiments, the difference between intended operating characteristics and actual operating characteristics during some time period(s) may indirectly or directly be reflected in the amount of grip being applied, increased, released, or lessened. As noted above, the amount of force applied to a driver's hand vis-à-vis smart glove 402a may be adjusted over time. For example, smart glove 402a may begin applying a first amount or level of grip force, and may transition to applying a second amount or level of grip force, and so on as may be needed to comport with desired augmented or intervening control. In some embodiments, smart glove 402a may transition from effectuating grip/increased grip via actuators 404a-e to effectuating a release of/lessening of grip via actuators 406a-e. In some embodiments, in the case of reinforcing a driver's understanding of the vehicle's operation, more grip force may be used to indicate that the driver is not comporting with a desired operation, whereas less grip force may be used to indicate that the driver is comporting with the desired operation.

It should be understood that smart glove 402a may be controlled together with glove 402b, e.g., glove control system 408a and/or determination circuit 322 may be used to instruct both smart gloves 402a and 402b in accordance with the same/similar kind and/or amount of influential control. In other embodiments, smart glove 402a and smart glove 402b may be controlled separately, or independent of each other, e.g., smart glove 402a and smart glove 402b may be controlled to deliver or otherwise impart differing types and/or levels of influential control to different hands of the driver. In some embodiments, as alluded to above, only a single smart glove may be utilized by a driver.

In some embodiments, monitored operation of smart glove 402a may provide feedback that can inform the programming or configuration of safety control unit 220, determination unit 322, smart glove 402a, etc. That is, in some embodiments, certain autonomously or semi-autonomously controlled vehicle maneuvers may be associated with drivers better or more closely following the intended vehicle maneuvers and vice-versa. For example, some combination of speed reduction and steering wheel angle of rotation may be used to achieve a desired result, e.g., properly navigating a particular turn. It may be that a greater amount of speed reduction may require less severe steering wheel manipulation/torque while greater speed requires more severe steering to compensate for that increased speed. In this scenario, feedback from smart glove 402a may suggest that drivers are more comfortable with the first combination of operations (greater speed reduction with less steering wheel rotation) Accordingly, autonomous control system 200 may be adjusted or reprogrammed to respond to navigating the same turn or similar turns in the future commensurate with the first combination of operations.

Figure 5:
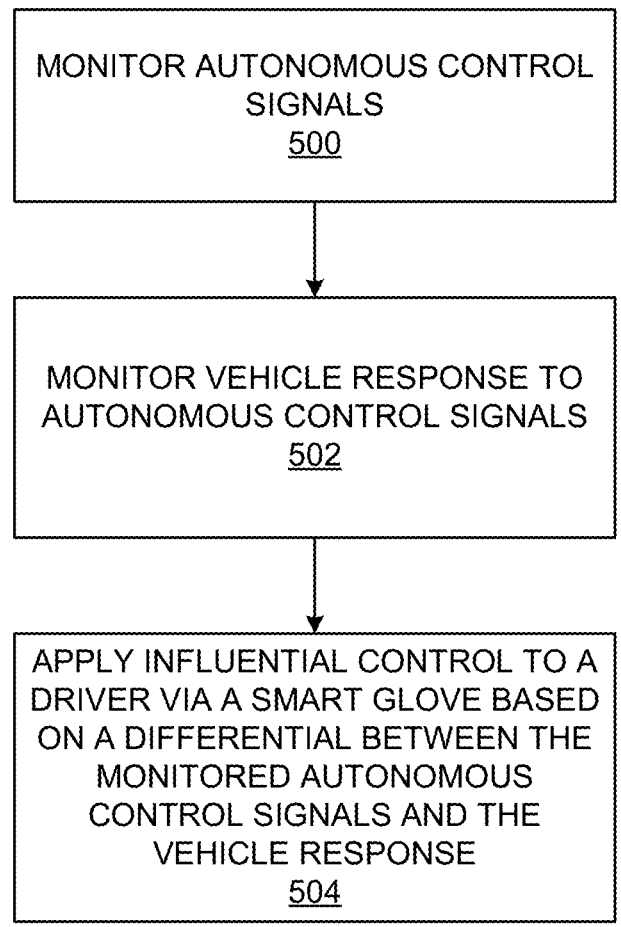
FIG. 5 is a flow chart illustrating operations that may be performed to effectuate influential control in accordance with one embodiment.

FIG. 5 is a flow chart illustrating example operations that may be performed to impart influential control over a driver operating a vehicle. At operation 500, autonomous control signals may be monitored. As described above, a safety control unit or one or more determination units thereof may receive autonomous control signals from an autonomous control unit, e.g., control unit 216 of autonomous control system 200 (FIG. 2A). The autonomous control signals may reflect desired operation of the vehicle, e.g., activation or actuation or one or more actuators, e.g., actuators 206 (which can be embodied as a steering wheel actuator, a brake pedal actuator, and so on).

At operation 502, the vehicle response to the autonomous control signals may be monitored. As described above, the autonomous control system of a vehicle, e.g., autonomous control system 200 may intend for vehicle 100 to operate in a particular manner, e.g., turn a certain direction by a certain amount, while moving at a certain speed, etc. Vehicle 100 may have external sensors (e.g., sensors 201), internal sensors (e.g., sensors 203), as well as other vehicle systems that may be able to provide information regarding a current operational state or condition of vehicle 100. This information can be compared to that reflecting the intended operation of vehicle 100. For example, autonomous control signals from control unit 216 to actuators 206 may indicate a desire to turn the vehicle 90 degrees commensurate within one second time period.

In response to the comparison at operation 502, influential control is applied to a driver of the vehicle via a smart glove based on the differential between the monitored autonomous control signals and the vehicle response. Following the above example, after the one second time period, it may be determined from one or more sensors that vehicle 100 has only turned 70 degrees in the desired direction. Accordingly, control unit 216 may increase the amount of steering torque applied to the steering wheel actuator (one of actuators 206) while simultaneously instructing a smart glove(s) being worn by the driver to increase the driver's grip onto the vehicle's steering wheel. In this way, a direct correlation can be drawn by the driver between intended operation of vehicle 100 and the added steering torque. Moreover, the increased grip can signal a need for the driver to impart greater steering torque and/or actually induce greater steering torque. Thus, in some scenarios, influential control as described herein may be used as strictly, a notification mechanism, whereas in other scenarios, influential control as described herein may be used to prompt and/or effectuate increased/decreased action or involvement by the driver.

Figure 6:
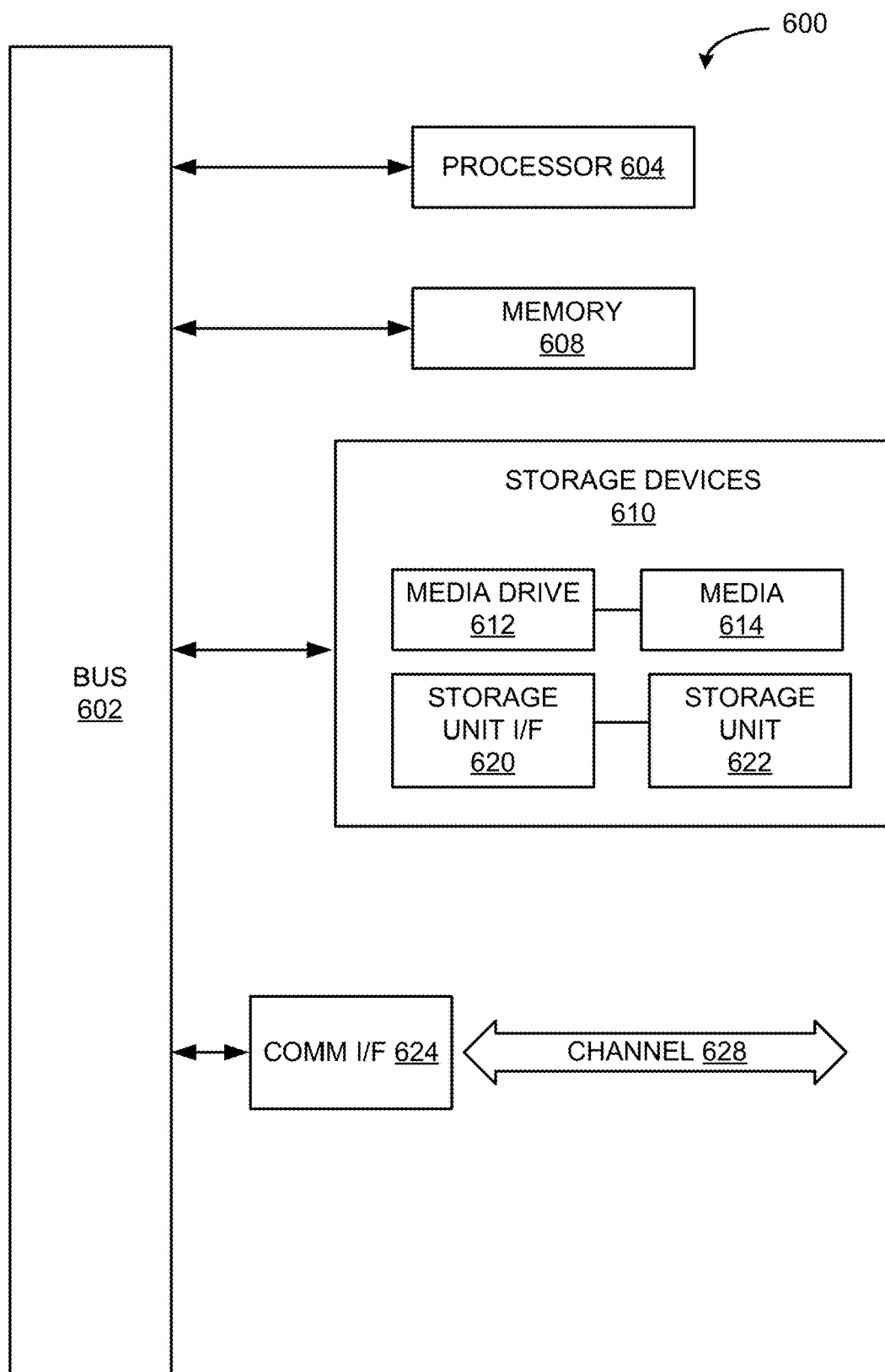
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
an autonomous control system adapted to provide one or more commands to autonomously control one or more systems of the vehicle;
an influential control component adapted to impart influential control over a driver's grip on a steering wheel of the vehicle, the imparted influential control effectuating reinforcement of the one or more commands to autonomously control the one or more systems of the vehicle.

2. The vehicle of claim 1, wherein the influential control component comprises a smart glove.

3. The vehicle of claim 2, wherein the smart glove comprises an actuator adapted to at least one of contract and expand in response to stimuli.

4. The vehicle of claim 3, wherein the at least one of the contraction and expansion of the actuator causes at least one of increasing strength of the driver's grip on the steering wheel, decreasing strength of the driver's grip on the steering wheel, gripping of the steering wheel via the driver's grip, and releasing the driver's grip on the steering wheel.

5. The vehicle of claim 4, wherein gripping of the steering wheel or increasing the strength of the driver's grip on the steering wheel comprises augmentative influential control.

6. The vehicle of claim 4, wherein releasing the driver's grip on the steering wheel or decreasing the strength of the driver's grip on the steering wheel comprises intervening influential control.

7. The vehicle of claim 1, wherein the autonomous control system monitors the vehicle's operational response to the one or more commands to autonomously control the vehicle.

8. The vehicle of claim 7, wherein the autonomous control system performs a comparison between the one or more commands to autonomously control the vehicle and the vehicle's operational response to the one or more commands to autonomously control the vehicle.

9. The vehicle of claim 8, wherein the autonomous control system determines a differential between the one or more commands to autonomously control the vehicle and the vehicle's operational response to the one or more commands to autonomously control the vehicle, and wherein the imparting of the influential control is based on the determined differential.

10. The vehicle of claim 9, wherein the imparting of the influential control based on the determined differential comprises imparting a level of influential control commensurate with the determined differential.

11. The vehicle of claim 1, wherein the imparting of the level of influential control comprises altering strength of the driver's grip on the steering wheel.

12. The vehicle of claim 1, wherein the one or more commands to autonomously control one or more systems of the vehicle comprise application of torque to the steering wheel.

13. The vehicle of claim 12, wherein the imparting of influential control over the driver's grip on the steering wheel induces application of additional torque to the steering wheel by the driver.

14. A vehicle, comprising:
a processor; and
a memory unit operatively connected to the processor and including computer code, that when executed, causes the processor to:
monitor autonomous control signals controlling motion of the vehicle;
monitor vehicle's motion in response to the autonomous control signals; and
apply influential control over a driver via a smart glove based on a differential between the monitored autonomous control signals and the monitored vehicle's motion in response to the autonomous control signals.

15. The vehicle of claim 14, wherein the smart glove comprises an actuator adapted to at least one of contract and expand in response to stimuli.

16. The vehicle of claim 15, wherein the at least one of the contraction and expansion of the actuator causes at least one of increasing strength of the driver's grip on the steering wheel, decreasing strength of the driver's grip on the steering wheel, gripping of the steering wheel via the driver's grip, and releasing the driver's grip on the steering wheel.

17. The vehicle of claim 16, wherein gripping of the steering wheel or increasing the strength of the driver's grip on the steering wheel comprises augmentative influential control.

18. The vehicle of claim 16, wherein releasing the driver's grip on the steering wheel or decreasing the strength of the driver's grip on the steering wheel comprises intervening influential control.

* * * * *